May 2, 1967  G. R. WINDERS  3,317,399
FUEL ELEMENT CONTAINER
Filed April 13, 1964
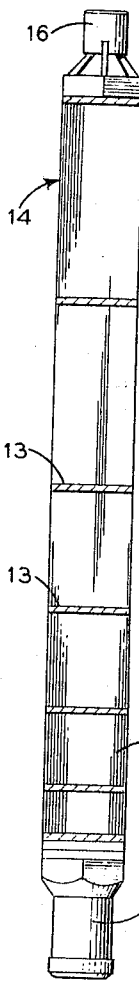
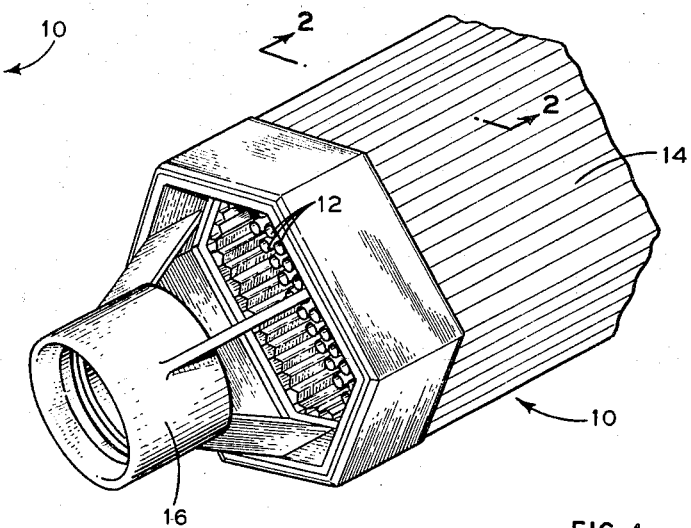
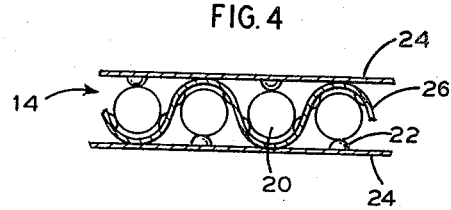
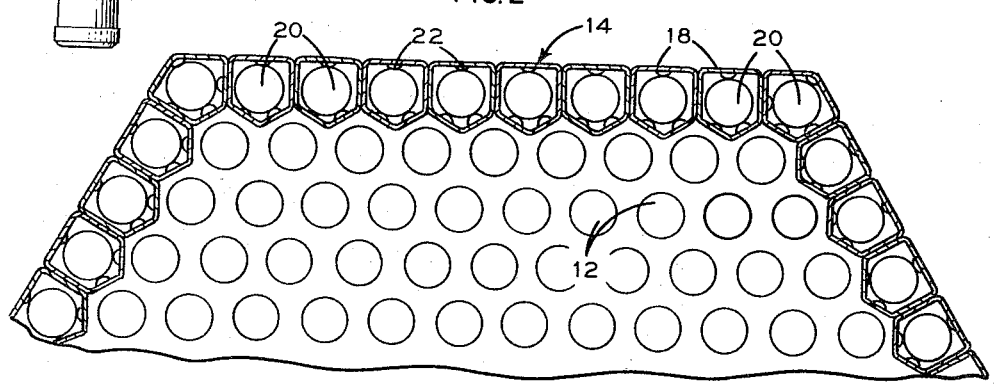
INVENTOR.
Gordon R. Winders
BY
*J. P. Moran*
ATTORNEY

United States Patent Office 3,317,399
Patented May 2, 1967

3,317,399
FUEL ELEMENT CONTAINER
Gordon R. Winders, Lynchburg, Va., assignor to The Babcock & Wilcox Company, New York, N.Y., a corporation of New Jersey
Filed Apr. 13, 1964, Ser. No. 359,267
7 Claims. (Cl. 176—78)

This invention relates in general to a fuel element container, and more specifically to an improved container which, while providing the required structural rigidity, reduces the amount of metal contained therein. The fuel element container of the invention furthermore eliminates differential expansion problems heretofore encountered with fuel element containers of the prior art as will be more fully disclosed hereinbelow.

In most nuclear reactors of the prior art it has been deemed desirable, if not necessary, to provide a plurality of fuel elements arranged as a core in the reatcor. These fuel elements have been of a size which permits ready handling of them for ease of maintenance. It has also been desirable, in most cases, to provide each fuel element with a container to control flow of the coolant therethrough. Such flow control within confined flow paths has been necessary to assure the desired heat transfer characteristics between the fuel elements and the coolant. Inasmuch as the coolant flow rates in nuclear reactors are usually quite high and thus result in significant amounts of pressure drop through the core, fuel element containers must be structurally rigid enough to resist the induced hydraulic forces of the coolant passing therethrough. In addition, these containers must be sufficiently rigid to protect the fuel elements contained therein from damage during handling of these elements as well as during their service life.

As a result of these requirements, fuel element containers generally have had solid metal walls, forming an elongated closed container open at both ends for the flow of coolant therethrough. These container walls have been as much as ¼ inch thick in fuel element assemblies of the prior art. Utilizing fuel element containers of this thickness and weight has been detrimental to the overall performance of the reactor since it resulted in a disproportionately large quantity of metal in the container positioned within the reactor core which added nothing to the production of power. Actually it reduced the efficiency of the chain reaction by non-productively absorbing a portion of the neutrons therein reducing the number of neutrons available for continuing the chain reaction.

A further disadvantage of fuel containers of the prior art resides in the fact that when using such comparatively thick metal walls they are susceptible to the problem of differential expansion between the side of the container facing the center of the core and the opposite side of the container. This results from the fact that a power gradient exists from the center of the core to the outer edge thereof which in turn results in a power gradient across the individual fuel elements. This causes a temperature gradient between the inner portion of the fuel element and the outer portion. Thus the inner wall, i.e. the one facing the center of the core, attains a higher temperature than does the outer wall of the fuel element, resulting in higher thermal expansion of the inner wall of the fuel element container than the outer wall. Inasmuch as nearly all present day reactor support arrangements have the fuel elements aligned only at their extremities the differential thermal expansion results in bowing of the fuel elements toward the center of the core. This bowing results in a massive movement of fuel towards the center of the core which is the equivalent to the insertion of more reactivity into the core. Inasmuch as the increased reactivity increases the power density in the core, the thermal gradient across the core is also increased and the differential expansion of the fuel elements becomes self aggravating.

The fuel container arrangement of the present invention is directed to the reduction of the amount of metal within the reactor core while still providing the requisite structural rigidity and, at the same time, providing a container which minimizes the differential expansion problems set forth above.

The present invention accordingly provides a longitudinally elongated fuel element container comprising a plurality of longitudinally extending tubular elements each of which tubular elements is joined along its length to the adjacent tubular elements to form a closed peripheral wall of the container.

Furthermore, means are provided for passing coolant fluid through these tubular elements.

Means are also provided, either by varying the size of the individual coolant flow passages through the container wall tubular elements and/or by selectively inserting fuel bearing members of varying concentrations of fissionable material in the tubular elements, to thereby minimize the differential expansion between the inner and outer walls of the container.

Additionally, means are provided to internally support the container wall against lateral hydraulic forces, which means may be in the form of fuel bearing member spacers which are longitudinally spaced along the length of the fuel element.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:

FIG. 1 is a perspective view of a portion of a fuel element of the present invention;

FIG. 2 is a greatly enlarged sectional view of the fuel element taken along line 2—2 in FIG. 1;

FIG. 3 is a longitudinal section of a fuel element of the present invention; and FIG. 4 is a modification of the present invention.

One end of a fuel element 10 having the container of the present invention is illustrated in FIG. 1. This fuel element comprises a plurality of fuel bearing members 12 arranged in a uniform lattice and held at both ends by known conventional means. These fuel bearing members 12 are held in the desired spaced relationship along their length by conventional spacer grids 13 (see FIG. 3) which are attached to the interior surface of the container wall 14. The longitudinal spacing between adjacent spacer grids is determined by the permissible longitudinal container wall span which is compatible with the local hydraulic load conditions on the container wall. Thus, the higher the hydraulic load on the container wall, the closer the longitudinal spacing of the spacer grids. Furthermore, the manner in which the container wall is loaded by the hydraulic forces will determine the type of connection between the spacer grids and the container wall. If the container is subjected to an external force the spacer grids will provide a compression support for the container wall and will, assuming the compression rigidity of the spacer grids, need only be connected to the container wall in such a manner as to assure the maintenance of the grids in the proper location. Conversely, if the container is subjected to an internal force the connection between the spacer grids and the container wall must be sufficient to transfer the forces to the spacer grids. The fuel element container 14 is provided at each end with a locating or handling assembly 16.

Referring now to FIG. 2 the sectional view of the fuel element shows the construction of the fuel element container 14. This container comprises a plurality of longitudinally extending tubular elements 18 which extend the full length of the fuel element 10. These tubular elements may be round, square, hexagonal or any other polygonal cross section and are joined together, as by brazing or welding, along the length thereof to the adjacent tubular elements to form the closed peripheral wall of the container. Each of the tubular elements is open at both ends to permit the flow of coolant fluid therethrough. The joints between adjacent tubular elements are such as to form a rigid, leak-tight peripheral wall of the fuel element container. If it is desirable, fuel bearing members 20 may be inserted within each of the tubular elements 18 which form the fuel element container. These fuel bearing members 20 are centered within the tubular elements 18, as by circumferentially disposed dimples 22, in the inner wall of the tubular elements 18.

With a fuel element container constructed according to the present invention, utilizing pentagonal tubes having a wall thickness of 0.010 inch and and overall dimension of 0.250 inch across the parallel faces with 0.625 inch long spacer grids on 2.5 inch centers, the structural strength is equivalent to that of a container fabricated from a solid plate having a thickness of 0.250 inch. Based upon this comparison it will be seen that when utilizing a fuel element container constructed according to the present invention a reduction of nearly 90% in the amount of fuel element container metal is achieved. Such a fuel element container will withstand a differential pressure across the wall thereof of 150 p.s.i. at a temperature of 1100° F.

It should be noted that the specific size and shape of the tubular elements forming the container wall will be determined by the operating conditions of the fuel element and by the shape and spacing of the fuel bearing members which comprise the fuel element.

A particular modification of the present invention is illustrated in FIG. 4 wherein the container 14 is formed of a pair of thin flat plates 24 which are rigidly held in spaced relationship by member 26 which may take the form of a corrugated plate. In this arrangement the required rigidity is also achieved without the amount of metal required by the constructions of the prior art. In this arrangement, too, fuel bearing members may be inserted within the container wall in a manner similar to that previously disclosed.

As noted above, differential expansion of the fuel element container may be minimized with the construction of the present invention. This may be accomplished in several ways. With the fuel bearing members 20 positioned within the tubular elements 18 either the size of these fuel bearing members or the concentration of fuel material within them may be varied between the side of the container facing the center of the reactor core and the opposite side. Thus, if the concentration is varied, a lower concentration of fuel would be utilized in the side of the container nearest the center of the core so that the amount of heat produced thereby will be less than that produced in the opposite side of the container, reducing the temperature of the container wall nearest the center of the core at least to or possibly below the temperature of the container on the opposite side. Alternatively, by utilizing fuel bearing elements of a smaller size in the side of the container nearest the center of the reactor core the coolant flow space therearound will be larger resulting in a higher coolant flow rate with lower coolant temperature in the side of the container nearest the center of the reactor core. Either of these methods of regulating container wall temperature may be utilized alone or in combination with the other. Further alternative arrangements include the utilization of elements within the container wall which contain either a fertile nuclear material or a neutron absorbing material or combinations of these with nuclear fuel material. It should also be realized that with the proper selection of these alternatives a fuel element container may be constructed which provides a negative temperature coefficient due to the fact that the inner wall of the container expands less than the outer wall of the container so that, as the temperature of the reactor core increases the fuel element container will bow outwardly, reducing the concentration of fuel at the center of the reactor core and reducing the reactivity.

While in accordance with the provisions of the statutes the invention has been illustrated and described in the best form and mode of operation now known, those skilled in the art will understand that changes may be made in the form of the invention covered by the claims, and that certain features of the invention may sometimes be used to advantage without a corresponding use of other features.

What is claimed is:

1. In a nuclear reactor having a core, an elongated nuclear fuel element comprising a plurality of elongated nuclear fuel bearing members aranged in laterally spaced relation to one another, a container for said fuel bearing members comprising a plurality of longitudinally extending tubular elements each joined along its length to adjoining elements to form a closed peripheral wall of said container, and a plurality of spacer grids spaced along the length of said fuel bearing members for maintaining said fuel bearing members in laterally spaced relationship to one another, each of said spacer grids being connected to the interior wall of said container, and at least some of said tubular elements which comprise said container themselves containing nuclear fuel bearing members arranged in spaced relationship therewith to provide a coolant flow path between said fuel bearing member and its associated tubular element.

2. In a nuclear reactor, the combination according to claim 1 wherein said tubular elements have a polygonal configuration.

3. In a nuclear reactor, the combination according to claim 1, wherein said tubular elements are rigidly and directly united one to the other along their length.

4. In a nuclear reactor, the combination according to claim 1 wherein said nuclear fuel bearing members are disposed centrally within their associated tubular elements so that the coolant flow path between said fuel bearing member and said tubular element is annular.

5. In a nuclear reactor, the combination according to claim 1, and further including neutron absorbing material bearing members disposed within at least some of said tubular elements.

6. In a nuclear reactor, the combination according to claim 2 wherein said fuel element has one side thereof facing the center of the reactor core, with fuel bearing members disposed within said tubular elements on the side of said fuel element facing the center of said core having a lower concentration of fuel than fuel bearing members within said container on the opposite side thereof.

7. In a nuclear reactor, the combination according to claim 2 wherein one side of said fuel element faces the center of the reactor core, with fuel bearing members within the tubular elements on the side of said fuel element facing the center of the core having a smaller cross section than fuel bearing members within said container on the opposite side thereof.

References Cited by the Examiner

UNITED STATES PATENTS

| | | | |
|---|---|---|---|
| 2,000,906 | 5/1935 | Turner | 165—169 X |
| 2,832,733 | 4/1958 | Szilard | 176—81 X |
| 2,947,678 | 8/1960 | Gimera et al. | 176—75 |
| 2,976,679 | 3/1961 | Dalgleish. | |
| 3,031,388 | 4/1962 | Barchet. | |
| 3,053,743 | 9/1962 | Cain | 176—76 X |
| 3,140,237 | 7/1964 | Peterson et al. | 176—18 |
| 3,163,584 | 12/1964 | Roche et al. | 176—78 |
| 3,175,955 | 3/1965 | Cheverton | 176—75 X |
| 3,177,935 | 4/1965 | Rosman | 165—172 X |

FOREIGN PATENTS

| | | |
|---|---|---|
| 625,535 | 3/1963 | Belgium. |
| 972,101 | 10/1964 | Great Britain. |

CARL D. QUARFORTH, *Primary Examiner.*

REUBEN EPSTEIN, LEON D. ROSDOL, *Examiners.*

H. E. BEHREND, *Assistant Examiner.*